United States Patent [19]
Dixon

[11] Patent Number: 5,875,195
[45] Date of Patent: Feb. 23, 1999

[54] METHOD AND APPARATUS FOR ERROR INJECTION TECHNIQUES

[75] Inventor: Robert Christopher Dixon, Austin, Tex.

[73] Assignee: International Business Machines Corporation, Armonk, N.Y.

[21] Appl. No.: 829,087

[22] Filed: Mar. 31, 1997

[51] Int. Cl.$^6$ .................................................. G06F 11/00
[52] U.S. Cl. ................................................ 371/21.2
[58] Field of Search ............................. 371/21.2, 21.3, 371/21.6; 365/201; 395/182.03, 182.04

[56] References Cited

U.S. PATENT DOCUMENTS 5,754,753  5/1998  Smelser ..................................... 371/37
5,768,287  6/1998  Norman et al. ............................ 371/21

Primary Examiner—Vincent P. Canney
Attorney, Agent, or Firm—Robert V. Wilder

[57] ABSTRACT

A process and implementing computer system in which a power-on self-test (POST) routine initially clears 203 a mask register 111 which is effective to mask or block data from being written to addresses in a synchronous DRAM or SDRAM 107. After disabling interrupts and caches, the tested SDRAM memory 107 is cleared to all "0"s. Sequential data byte lanes are tested by writing bits in a predetermined pattern to inject errors at predetermined bytes in SDRAM, setting selected mask register bits and then writing all "0"s to the predetermined addresses. The tested memory locations are read and compared with the predetermined pattern for errors. Detected errors are noted by recordation and the memory locations are cleared as the method recycles until all of the data byte lanes have been tested and the results recorded.

32 Claims, 3 Drawing Sheets 5,875,195

METHOD AND APPARATUS FOR ERROR INJECTION TECHNIQUES

FIELD OF THE INVENTION

The present invention relates generally to information processing systems and more particularly to an improved signal processing method and device for memory testing.

BACKGROUND OF THE INVENTION

In information processing systems, memory sub-system testing for synchronous DRAM (SDRAM) is not easily achieved unless the memory controller is specifically designed to achieve that task. SDRAM data typically flows directly to the microprocessor in the case of high performance systems. Since the Error Correction Code (ECC) block is generally between a microprocessor bus and the SDRAM data, specially designed ECC blocks are required to force errors in the "read" path, or to read the ECC check bits that have been generated.

Thus, ECC techniques have involved the application of special processing and programming by a memory controller and the introduction of special hardware into a processing system solely for the purpose of testing selected sections of the system. In the past, ECC has operated by dedicated data paths to memory that bypass the ECC data paths, or special circuitry to simulate errors on reading a memory word. Typically, such testing circuitry has been quite complex and extensive and still falls short of providing optimum testability and returned results for memory subsystems with regard to the identification and specification of malfunctions, especially in memory testing.

Accordingly, there is a need for an improved testing apparatus and methodology which is effective to provide more accurate testing results and identification of faults within a memory subsystem being tested.

SUMMARY OF THE INVENTION

A method and implementing system are provided in which a memory subsystem is tested using existing data byte lanes through the implementation of a mask register effective to block data writes to selected addresses in the memory subsystem. Initially, interrupts are disabled and the mask and memory are cleared. Data byte lanes are then tested by injecting predetermined test patterns to selected addresses. The mask is then set to mask a selected data path and a second test pattern is written to the selected addresses. The mask is then cleared and the memory location is read and compared with the initial test pattern. Detected errors are noted and the process is repeated until all of the data byte lanes have been tested and the test results have been indicated.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
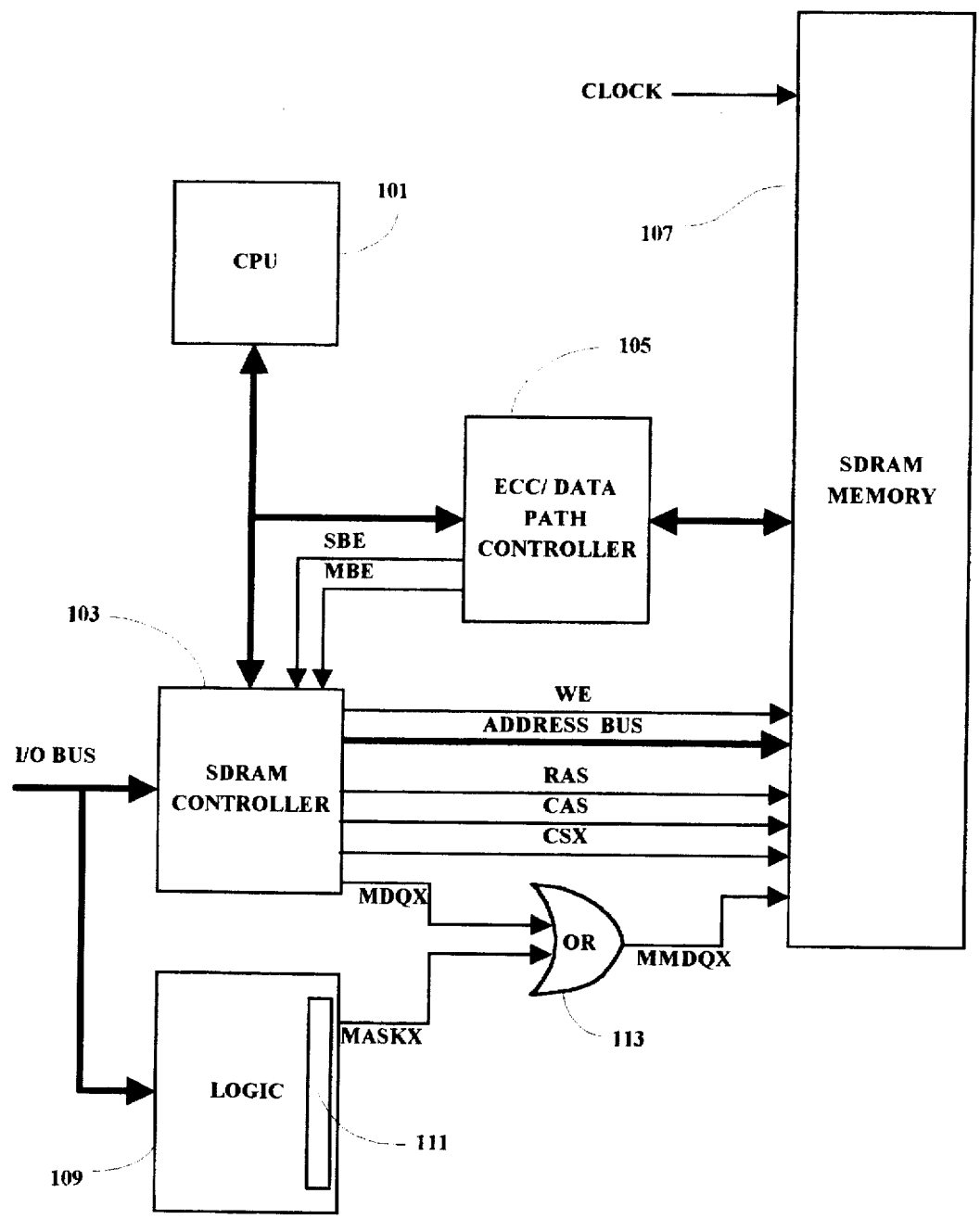
FIG. 1 is a simplified block diagram of a portion of a typical information processing system in which the present invention is implemented.

With reference to FIG. 1, the various methods discussed above may be implemented within a typical computer system, or workstation or network server for example. An exemplary hardware configuration of a portion of a typical workstation or personal computer or server which may be used in conjunction with the present invention is illustrated and includes a central processing unit (CPU) 101, such as a conventional microprocessor, and a number of other units interconnected through a system bus arrangement. The bus arrangement may include connections to other workstations or networks, other peripherals and the like.

The CPU 101 is connected to a Synchronous Dynamic Random Access Memory (SDRAM) controller 103 and also to a data path controller 105. The data path controller 105 is connected to an SDRAM memory unit 107 which also receives a system clock input for synchronization. The SDRAM memory is a dual in-line memory module (DIMM) in the present example. The SDRAM controller 103 receives input from and provides output to an Input/Output (I/O) bus. The I/O bus also provides input to a logic block 109. The logic block or circuit 109 includes a mask register 111 which is arranged to provide a mask output signal for application to one input of a two input OR function circuit or gate 113. The mask register 111 could have also been included within the SDRAM controller circuitry 103. Gate 113 also receives an MDQX data input and provides a masked MDQX data signal MMDQX which is applied to the SDRAM memory 107. The connection between the data path controller 105 and the SDRAM memory 107 in the present example includes 64 data bit lines and 8 check bit lines. The memory 107 also receives a write enable WE input signal as well as row address strobe RAS, column address strobe CAS and chip select CSX (the "X" value designates a particular chip of a plurality of chips) signals from the SDRAM controller 103. The data path controller 105 also provides a single bit error (SBE) signal and a multiple bit error (MBE) signal which are applied to the SDRAM controller 103.

Figure 3:
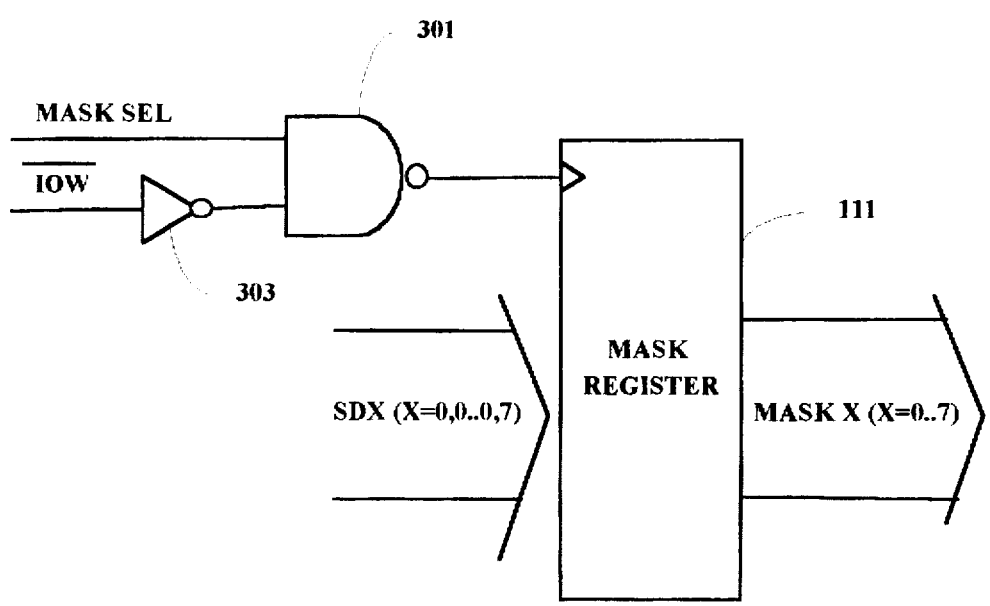
FIG. 3 is a circuit diagram showing the mask register input and output signals.

As shown in FIG. 3, the mask register 111 receives data signals SDX, which is an 8-bit byte with each bit corresponding to a byte lane. The register outputs the masked data signal MASKX which is applied to the gate 113. The register 111 also receives a timing input from an NAND gate 301. Gate 301 receives input signals MASK SEL (indicative of the masking function being selected) and an input/output write (IOW) signal from the output of an inverter 303.

In operation, SDRAM technology typically runs burst operations, i.e. 4-beat write functions and 4-beat read functions. To allow single byte writes, mask bits are associated with various memory data groups. When configured, SDRAM expects a fixed burst length. A single word write operation is achieved by a write to the required memory location and the other beats in the burst are masked, i.e. MMDQX="1". For write operations, the mask input makes the write operation for that clock into a "non-operation". By utilizing the mask bits in a power-on self test (POST) operation, test software can set error patterns in memory. When such error patterns are read, the test software can determine if the subsystem response to the errors was correct or not.

In the present example, both the SDRAM controller 103 and the ECC data block, which is located within the data path controller 105, are generic functions without any facility to test ECC SDRAM error correcting and error logging functionality. In order to achieve that functionality, the present example has included an 8 bit mask register 111 and an "OR" function circuit 113 to functionally "OR" the memory controller mask bits MDQX and the mask register bits MASKX. In new memory controllers, the new register can be incorporated into the design of the SDRAM controller itself.

The mask bits from the SDRAM memory controller 103 are labeled MDQX and include eight individual mask bits MDQ0 through MDQ7 in the present example. The mask bits are "active high" in the present example so the "OR" function means that for a given mask register bit set to a "1", the corresponding byte in the 8 byte memory word in the present example is masked. The remaining 7 bytes and the corresponding check word are written but the masked byte remains at its previous value.

The "X" designation refers to the byte lane number from "0" through "7", for the eight byte lanes (each being 8 bits wide) in the 64 bit data paths of the present example. When "X" is "0" for example, the register 111 is applied to the first byte lane of 8 bits in the data path, and when one of the register bit positions contains a logic "1" level, that particular bit position is "masked" or blocked from receiving data written to it. Accordingly, during a memory test procedure, "X" will be cycled through "0" through "7" as all of the corresponding byte lanes "0" through "7" are tested. In an exemplary testing procedure, for the first byte lane including the first 8 bit data lines, a test data pattern including a predetermined sequence of logic "1"s and "0"s, for example "0000000000000001", is written to a predetermined address "Z", with the mask register set at all "0"s, i.e. none of the bit positions will be blocked from receiving the written-in pattern. Next, the mask register is set to a predetermined condition, for example "00000001" so that the first bit position is "masked" or blocked from receiving data written to it. Then another predetermined pattern, for example "0000000000000000", is written to the selected address being tested. At that time, the new data pattern of all "0"s will be written to the tested address but since the first bit position is blocked or masked, the first bit position will not read-in the "0" value but rather will retain the original "1" value in the first bit position. Next the mask register is again set to all "0"s to unblock the register and allow data to be read from or written to memory through the particular byte path being checked. Then the stored pattern is read out and checked against or compared with the second test pattern written, i.e. "0000000000000000".

At that point, it is determined if there are any errors. In the present example, there would be a single bit error SBE signal returned to the controller 103. In the example used, the SBE signal would represent that the ECC function tested good for the particular bit that was tested. In other conditions where there would be more than a single bit error detected, there would be a multiple bit error MBE signal returned to the controller. The system may be designed to produce an indicium representative of the particular error signals returned per tested byte lane such as a printout, with or without a testing shut-down and displayed message. The results may also be stored for reference and/or later retrieval. In the present example, the SDRAM controller 103 monitors the SBE and MBE signals and makes their status available to the CPU 101 via an error status register (not shown). The error log thus generated is typically applied to an error display or to a terminal.

Figure 2:
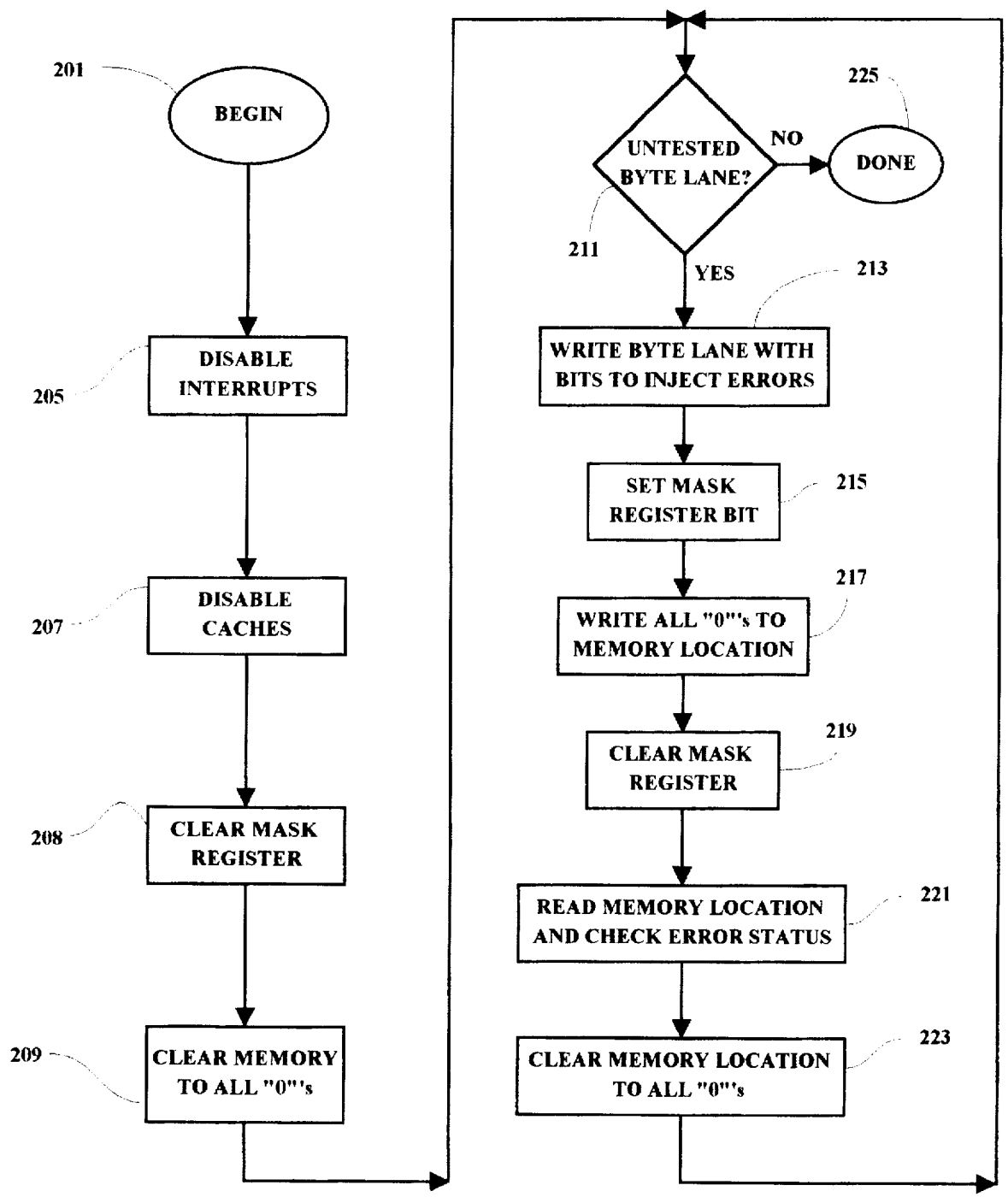
FIG. 2 is flow chart illustrating the methodology implemented in accordance with the present invention.

The methodology implemented in accordance with the present invention is summarized and further illustrated in the FIG. 2 flow chart. The implementing software in the present example is executed from the POST ROM and no SDRAM activity resulting from subroutine calls or interrupt processing is allowed during the testing process. As shown in FIG. 2, when the process is initiated 201, all interrupts are disabled 205. Next all caches are disabled 207 and the mask register 111 is cleared 208. The main SDPAM memory 107 is then cleared 209 to all "0"s, and a determination is made as to whether there are any untested byte lanes 211. A byte lane is one of 8 possible 8-line groups of the 64 data lines in the data bus between the data path controller 105 and the SDRAM memory 107. Next, since none of the lanes have yet been tested, a byte lane is written 213 with test pattern bits to inject errors. Next, a bit position in the mask register 111 is set 215 and all "0"s are written to a memory location. At that point, all "0"s will be written to the memory location except for the byte position that has been masked. The masked byte position will therefore retain the value it held prior to the "0" write 217. Next, the mask register is cleared 219 and the memory location is read and checked for error status 221. This step would also include the recording and/or reporting of any existing error status. Thereafter, the memory location is again cleared to all "0"s and a determination is made as to whether there are any remaining untested byte lanes 211. After all byte lanes have been tested and logged, the memory test from the POST routine is finished 225.

The disclosed method of processing is directly applicable to individual personal computers and workstations as they are powered-on for operation in connection with other POST processing. In addition, this methodology may be scheduled on server units as well, for "run-time" testing wherein the methodology is applied periodically as a memory check program in order to test memory on a regular basis since many servers rarely power-down and hence would not otherwise be able to implement a POST routine. In run-time testing, the operating system periodically reads memory locations that are reserved for test purposes and that have been set with errors or predetermined patterns during an initial power-on of the server. The operating system then verifies correct response of the error checking system.

The method and apparatus of the present invention has been described in connection with a preferred embodiment as disclosed herein. It is not required that all of the steps illustrated are implemented in a testing routine or that such steps are implemented in the specific sequence shown, in order to achieve the benefits of the present invention. Although an embodiment of the present invention has been shown and described in detail herein, along with certain variants thereof, many other varied embodiments that incorporate the teachings of the invention may be easily constructed by those skilled in the art, and even included or integrated into a CPU or other integrated circuit or chip, or programmed into a storage medium. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for testing a memory, said method comprising:

clearing said memory;
writing a first test pattern of test signals to said memory;
blocking predetermined data paths to said memory;
writing a second test pattern of test signals to said memory;
unblocking the data paths to said memory; and
reading predetermined memory locations in said memory to provide a readout pattern.

2. The method as set forth in claim 1 and further including:
comparing said readout pattern with said first test pattern of test signals.

3. The method as set forth in claim 2 wherein after said comparing, said method further includes providing an output signal representative of variances between said readout pattern and said first test pattern of test signals.

4. The method as set forth in claim 3 wherein said output signal is representative of a number of bit positions containing variances between said readout pattern and said first test pattern of test signals.

5. The method as set forth in claim 3 and further including:
storing said output signal in a storage device.

6. The method as set forth in claim 3 and further including:
transmitting said output signal to a storage device; and
storing said output signal in said storage device.

7. The method as set forth in claim 1 and further including:
repeating said method for separate groups of data paths until all of said data paths have been tested.

8. The method as set forth in claim 7 and further including, after said reading:
clearing said memory after each cycle of testing each group of said separate groups of said data paths.

9. The method as set forth in claim 5 and further including:
repeating said method for separate groups of data paths until all of said data paths have been tested.

10. The method as set forth in claim 9 and further including, after said reading:
clearing said memory after each cycle of testing each group of said separate groups of said data paths.

11. The method as set forth in claim 1 wherein said second test pattern comprises all logic "0" level test signals.

12. The method as set forth in claim 1 and further including:
executing said method at predetermined times.

13. The method as set forth in claim 12 wherein said memory is within an information processing system, said method further including:
executing said method at each power-on of said information processing system.

14. The method as set forth in claim 13 wherein said method is executed at predetermined times following said power-on time.

15. An information processing system comprising:
a processor device;
a memory device;
a memory controller connected between said processor and said memory device;
a data path controller connected between said processor and said memory device; and
a masking device connected to said memory device, said masking device being selectively responsive to masking signals applied thereto for masking selected data paths between said data path controller and said memory device.

16. The information processing system as set forth in claim 15 wherein said masking device is implemented separately from said memory controller.

17. The information processing system as set forth in claim 15 wherein said masking device is implemented within said memory controller device.

18. The information processing system as set forth in claim 15 wherein said masking device is comprised of:
a masking register wherein each bit position of said masking register corresponds to a predetermined data byte lane of data paths to said memory device;
an OR gate connecting said masking register to said memory device; and
a select circuit connected to said masking register, said select circuit being effective to enable a selection of said masking register during a memory test procedure, said select circuit being further effective to disable said masking register at times when said memory test procedure is not executing.

19. A storage medium including machine readable indicia, said storage medium being selectively coupled to a reading device, said reading device being coupled to processing circuitry, said reading device being selectively operable to read said machine readable indicia and provide program signals representative thereof, said program signals being effective to cause said processing circuitry to test a memory by performing the steps of:
clearing said memory;
writing a first test pattern of test signals to said memory;
blocking predetermined data paths to said memory;
writing a second test pattern of test signals to said memory;
unblocking the data paths to said memory; and
reading predetermined memory locations in said memory to provide an readout pattern.

20. The storage medium as set forth in claim 19 wherein said program signals are further effective, when applied to said processing circuitry, for:
comparing said readout pattern with said first test pattern of test signals.

21. The storage medium as set forth in claim 20 wherein after said comparing, said program signals are further effective, when applied to said processing circuitry, for providing an output signal representative of variances between said readout pattern and said first test pattern of test signals.

22. The storage medium as set forth in claim 21 wherein said output signal is representative of a number of bit positions containing variances between said readout pattern and said first test pattern of test signals.

23. The storage medium as set forth in claim 21 wherein said program signals are further effective, when applied to said processing circuitry, for:
storing said output signal in a storage device.

24. The storage medium as set forth in claim 21 wherein said program signals are further effective, when applied to said processing circuitry, for:
transmitting said output signal to a storage device; and
storing said output signal in said storage device.

25. The storage medium as set forth in claim 19 wherein said program signals are further effective, when applied to said processing circuitry, for:
repeating said steps for separate groups of data paths until all of said data paths have been tested.

26. The storage medium as set forth in claim 25 wherein, after said reading, said program signals are further effective, when applied to said processing circuitry, for:
clearing said memory after each cycle of testing each group of said separate groups of said data paths.

27. The storage medium as set forth in claim 23 wherein said program signals are further effective, when applied to said processing circuitry, for:

repeating said steps for separate groups of data paths until all of said data paths have been tested.

28. The storage medium as set forth in claim 27, and, after said reading, said program signals are further effective, when applied to said processing circuitry, for:

clearing said memory after each cycle of testing each group of said separate groups of said data paths.

29. The storage medium as set forth in claim 19 wherein said second test pattern comprises all logic "0" level test signals.

30. The storage medium as set forth in claim 19 wherein said program signals are further effective, when applied to said processing circuitry, for:

causing an execution of said steps at predetermined times.

31. The storage medium as set forth in claim 30 wherein said memory is within an information processing system, wherein said program signals are further effective, when applied to said processing circuitry, for causing an execution of said steps at each power-on of said information processing system.

32. The storage medium as set forth in claim 31 wherein said program signals are further effective, when applied to said processing circuitry, for causing an execution of said steps at predetermined times following said power-on time.

* * * * *